United States Patent Office 3,700,630
Patented Oct. 24, 1972

3,700,630
MODIFIED POLYPHENYLENE OXIDE AND
METHOD FOR PRODUCTION THEREOF
Takaki Hamada, Niihama, Seizo Nakashio, Nishinomiya,
Isao Maruta, Ibaragi, and Kazuo Hayatsu, Tetsuki Seto,
and Yoichi Kono, Takatsuki, Japan, assignors to Sumitomo Chemical Company Limited, Osaka, Japan
No Drawing. Continuation-in-part of application Ser. No.
845,066, July 25, 1969. This application Aug. 23, 1971,
Ser. No. 174,138
Claims priority, application Japan, Aug. 8, 1968,
43/56,501
Int. Cl. C08g 23/20
U.S. Cl. 260—17.2 S                   14 Claims

ABSTRACT OF THE DISCLOSURE

Modified polyphenylene oxides excellent in processability and moldability are obtained by graft-polymerizing on a polyphenylene oxide a styrene type compound or a mixture of the styrene type compound and an $\alpha$-alkyl substitution product of said compound, in an aqueous dispersion containing an anionic or nonionic surfactant, a radical initiator and a solvent for the polyphenylene oxide.

---

This is a continuation-in-part of application Ser. No. 845,066 filed July 25, 1969 and now abandoned.

This invention relates to a method for producing modified polyphenylene oxides having improved processability and moldability. More particularly, the invention pertains to a process for preparing modified polyphenylene oxides excellent in processability and moldability by polymerizing a styrene derivative in the presence of a polyphenylene oxide.

Attention has come to be paid to polyphenylene oxides as resins excellent in resistance to heat and chemicals and in mechanical and electrical properties. Polyphenylene oxides have, however, a drawback in that they are relatively inferior in processability and moldability due to a high softening point which is an inherent property.

With an aim to improve polyphenylene oxides in processability and moldability without injuring their excellent properties, there have heretofore been proposed several processes for producing polyphenylene oxide compositions by polymerizing styrene derivatives in the presence of polyphenylene oxides. However, in polymerizing a styrene type compound in various solvents in the presence of a radical initiator as a catalyst, the conversion of the compound is greatly affected by the concentration thereof. According to the experiments of the present inventors a conversion of 80% or more could not be attained unless the monomer concentration was at least 70% by weight, and if the monomer concentration was less than 70% by weight, e.g. 20% by weight, the conversion of the compound did not reach about 25%. It is therefore disadvantageous from the industrial standpoint to polymerize a styrene type compound at a monomer concentration of less than 70% by weight. Further, in case a styrene type compound is polymerized according to an ordinary process in the presence of a polyphenylene oxide, the polymerization of the compound is suppressed or inhibited due to the phenolic hydroxyl group of the polyphenylene oxide, and the conversion of the styrene compound is more lowered than in the case where no polyphenylene oxide is present. Particularly when the amount of polyphenylene oxide is large, there are some cases where the polymerization of styrene type compound does not progress at all. Even if the polymerization of a styrene type compound has taken place in the presence of a polyphenylene oxide, the graft conversion and graft efficiency of styrene are extremely low, and a graft polymer of polyphenylene oxide and a styrene type compound is scarcely obtained.

Such a relationship as mentioned above will be explained below with reference to Referential Examples 1 and 2.

REFERENTIAL EXAMPLE 1

Into a 200 ml. separable flask equipped with a thermometer, a nitrogen-injecting pipe and a condenser was charged a mixture of poly-2,6-dimethyl-1,4-phenylene oxide (hereinafter referred to as "polyether"), industrial xylene and styrene. Into the flask, a nitrogen gas was introduced, while stirring the mixture, to exclude oxygen in the system. Subsequently, 1.0% by weight based on the styrene of benzoyl peroxide was added as a catalyst, and the mixture was heated and reacted in a nitrogen atmosphere with stirring at 80° C. for 5 hours. After completion of the reaction, the reaction mixture was charged into methanol to deposit a polymer as a precipitate. Thereafter, the precipitate was filtered, washed and dried. The results are shown in Table 1.

TABLE 1

| Run No. | Styrene (g.) | Polyether (g.) | Industrial xylene (g.) | Styrene concentration (wt. percent) | Polyether/styrene weight ratio | Styrene conversion (percent) | Ratio of conversion, presence of polyether/absence of polyether |
|---|---|---|---|---|---|---|---|
| 1 | 10 | 10 | 80 | 10.0 | 1.0 | 0 | 0 |
| 2 | 10 | 4 | 36 | 20.0 | 0.4 | 1.0 | 0.048 |
| 3 | 10 | 1 | 9 | 50.0 | 0.1 | 24.3 | 0.575 |
| 1' | 10 | 0 | 90 | 10.0 | 0 | 12.5 | |
| 2' | 10 | 0 | 40 | 20.0 | 0 | 21.8 | |
| 3' | 10 | 0 | 10 | 50.0 | 0 | 42.3 | |

REFERENTIAL EXAMPLE 2

Into a 200 ml. separable flask equipped with a thermometer, a nitrogen-injecting pipe and a condenser was charged a mixture comprising 2.7 g. of polyether, 24.3 g. of industrial xylene and 3.0 g. of styrene. Into the flask, a nitrogen gas was injected, while stirring the mixture, to exclude oxygen in the system. Subsequently, $1.8 \times 10^{-4}$ moles of the polymerization initiator and $1.8 \times 10^{-4}$ moles of the reducing agent set forth in Table 2 were added, and the mixture was heated and reacted in a nitrogen atmosphere with stirring under the polymerization conditions shown in Table 2. The reaction product was treated in the same manner as in Referential Example 1 to obtain a polymer. The polymer was further subjected to such operation that it was extracted, under reflux, with acetone containing 15–20% by weight of cyclohexane, was filtered and was further extracted by addition of fresh acetone containing 15–20% by weight of cyclohexane. The above operation was repeated 10 times, and the extraction treatment was effected for 30 hours to obtain a graft polymer as an extraction residue.

From the yield of the graft polymer, the graft conversion and graft efficiency of styrene were calculated according to the following equations:

Styrene graft conversion (%)
$$= \frac{\left(\begin{array}{c}\text{Weight of graft}\\\text{polymer}\end{array}\right) - \left(\begin{array}{c}\text{Weight of fed}\\\text{polyether}\end{array}\right)}{\text{Weight of fed styrene}} \times 100$$

Styrene graft efficiency (%)
$$= \frac{\left(\begin{array}{c}\text{Weight of graft}\\\text{polymer}\end{array}\right) - \left(\begin{array}{c}\text{Weight of fed}\\\text{polyether}\end{array}\right)}{\left(\begin{array}{c}\text{Weight of whole}\\\text{polymer}\end{array}\right) - \left(\begin{array}{c}\text{Weight of fed}\\\text{polyether}\end{array}\right)} \times 100$$

The results are shown in Table 2.

is used in far larger amount than the polyphenylene oxide. It should therefore be said that the technique disclosed therein is concerned with the modification of polystyrene rather than the modification of polyphenylene oxide. The present inventors effected the polymerization of styrene according to the process of said Dutch patent application, but the dispersion system was poor in dispersed state and the polymerization did not proceed smoothly.

This relationship will be explained in Referential Example 3 shown below.

REFERENTIAL EXAMPLE 3

In the same manner as in Referential Example 1, the polymerization of styrene was effected at 80° C. for 10 hours in the presence of polyether in water or in an aqueous solution containing sodium stearate as a surfactant,

TABLE 2

| Run Number | Catalyst Initiator | Catalyst Reducing agent | Polymerization condition Temperature (° C.) | Polymerization condition Time (hr.) | Styrene conversion (percent) | Styrene graft conversion (percent) | Styrene graft efficiency (percent) |
|---|---|---|---|---|---|---|---|
| 1 | BPO | DMA | 105 | 10 | 0 | 0 | 0 |
| 2 | BPO |  | 105 | 10 | 2.9 | 0 | 0 |
| 3 | LPO | DMA | 80 | 10 | 5.8 | 0 | 0 |
| 4 | LPO |  | 80 | 10 | 7.9 | 0 | 0 |
| 5 | AIBN | DMA | 105 | 10 | 16.9 | 1.5 | 8.9 |
| 6 | AIBN |  | 102 | 10 | 13.9 | 1.2 | 9.2 |

NOTE.—BPO=Benzoyl peroxide; LPO=Lauroyl peroxide; AIBN=$\alpha,\alpha'$-azobisisobutyronitrile; DMA=N,N-dimethylaniline.

As is clear from the above, it is difficult to proceed with substantial polymerization unless the amount of polyusing 0.1 g. of benzoyl peroxide as a catalyst but without using industrial xylene. The results are shown in Table 3.

TABLE 3

| Run number | Styrene (g.) | Polyether (g.) | Water (g.) | Surfactant | Styrene conversion (percent) | Styrene graft polymerization efficiency (percent) |
|---|---|---|---|---|---|---|
| 1 | 10 | 10 | 20 | 0 | Slight | 0 |
| 2 | 10 | 10 | 20 | 2 | do | 0 | phenylene oxide is made small as far as possible and the concentration of styrene type compound is made high. Moreover, even in the polymerization under such conditions as mentioned above, it is not always possible to say that an industrially satisfactory conversion has been attained.

Concrete examples of polymerization of styrene type compounds in the presence of polyphenylene oxides are disclosed in, for example, Japanese patent publication No. 22,069/67 and Dutch patent application No. 66-17,395.

In Japanese patent publication No. 22,069/67, styrene is polymerized in the presence of a polyphenylene oxide without using any solvent, but the styrene itself is used as a solvent for the polyphenylene oxide. However, for the bulk-polymerization of styrene containing a polyphenylene oxide dissolved therein, the styrene should be used in large quantities. (In said Japanese patent publication, styrene is used in 9 times the amount of polyphenylene oxide.) In the polymerization product, therefore, styrene is contained in a large amount, unless the yield is consciously lowered for the purpose of controlling the styrene content, and the excellent properties of polyphenylene oxide have been lost.

Dutch patent application No. 66-17,395 discloses a process in which styrene is polymerized in a suspension type aqueous dispersion in the presence of a polyphenylene oxide. In said patent application, however, the styrene Thus, in polymerizing, according to the known process, a styrene type compound in the presence of a polyphenylene oxide, it is necessary to use the styrene type compound at a high concentration and in a large amount based on the polyphenylene oxide. Accordingly, if a high conversion is desired to be attained, the resulting polymerization product comes to contain a large amount of styrene type compound, with the result that the excellent properties of polyphenylene oxide are injured. In order to maintain the excellent properties of polyphenylene oxide, the conversion of the styrene type compound should be inhibited to a low extent to bring about economical disadvantages. Further, most of the products obtained according to the known process are mere mixtures of polyphenylene oxides and stryene type compounds. It is well known that graft polymers high in graft efficiency are more excellent in properties than mere mixtures of polymers. Accordingly, there has been desired the advent of graft polymers higher in graft efficiency of styrene type compounds on polyphenylene oxides.

The present inventors made various studies on processes for polymerizing styrene type compounds in the presence of polyphenylene oxides. As the result, the inventors found that graft polymers high in polyphenylene oxide content and in graft efficiency of styrene type compounds can be produced by effecting the polymerization of a styrene type compound in the presence of a polyphenylene oxide in an aqueous dispersion containing a solvent for the polyphenylene oxide and a specific surfactant. Based on the above finding, the inventors have attained the present invention.

An object of the present invention is to provide a method in which a styrene type compound is polymerized in the presence of a polyphenylene oxide to produce, without injuring excellent properties inherent to the polyphenylene oxide, a modified polyphenylene oxide having improved processability and moldability.

Another object is to provide a modified polyphenylene oxide, which has been improved in processability and moldability without injuring excellent properties inherent to polyphenylene oxide.

A further object is to provide a method for improving a polyphenylene oxide in processability and moldability by graft-polymerizing a styrene compound on the polyphenylene oxide.

Other objects will become apparent from the following description.

In order to accomplish these objects, the present invention provides a method for producing modified polyphenylene oxides, characterized in that a styrene derivative represented by the formula,

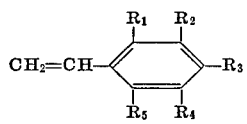

[Ia]

wherein $R_1$, $R_2$, $R_3$, $R_4$ and $R_5$ represent individually a hydrogen atom, a halogen atom, a cyano group, a nitro group, an amino group, a mono- or di-alkylamino group, a sulfo group, an unsubstituted or halogen- or cyano-substituted hydrocarbon group, or an unsubstituted or halogen-substituted hydrocarbonoxy group, or of a mixture of the styrene derivative of the above-mentioned Formula Ia and an α-alkyl-substituted styrene derivative represented by the formula,

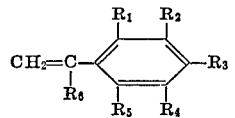

(Ib)

wherein $R_1$, $R_2$, $R_3$, $R_4$ and $R_5$ have the same meanings as defined above, and $R_6$ represents an alkyl group, is brought into contact with a radical initiator in the presence of a polyphenylene oxide having recurring structural units represented by the formula,

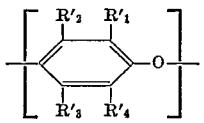

(II)

wherein $R'_1$, $R'_2$, $R'_3$ and $R''_4$ represent individually a hydrogen atom, a halogen atom, an unsubstituted or halogen- or cyano-substituted hydrocarbon group, an unsubstituted or halogen-substituted hydrocarbonoxy group, a cyano group, a mono- or di-alkylamino group or a nitro group, in an aqueous dispersion comprising water, an anionic, or nonionic surfactant and a solvent for the above-mentioned polyphenylene oxide.

The present invention further provides a method for improving a polyphenylene oxide in processability and moldability by graft-polymerizing on the polyphenylene oxide, according to the above-mentioned method, a styrene derivative represented by the aforesaid Formula Ia or a mixture of said styrene derivative with an α-alkylsubstituted styrene derivative represented by the aforesaid Formula Ib.

Concrete examples of $R_1$, $R_2$, $R_3$, $R_4$ and $R_5$ in the formulas representing the styrene derivatives and α-alkyl-substituted styrene derivatives employed in the present invention include hydrogen atoms, halogen atoms such as chlorine, bromine and iodine atoms, hydrocarbon groups such as methyl, ethyl, propyl, vinyl, allyl, phenyl, benzyl, methylbenzyl, halogen- or cyano-substituted hydrocarbon groups such as chloromethyl, bromomethyl, cyanoethyl, cyano, nitro, amino, and unsubstituted or halogen-substituted hydrocarbonoxy groups such as methoxy, ethoxy, phenoxy and monochloromethoxy groups.

Concrete examples of $R_6$ in the Formula Ib include methyl, ethyl and the like groups.

Examples of the styrene derivatives represented by the Formula Ia include styrene, 2,4-dichlorostyrene, p-methoxystyrene, p-nitrostyrene, p-methylstyrene, p-phenylstyrene, p-acetoxystyrene, p-aminostyrene, p-chlorostyrene, o-hydroxystyrene, p-(monochloromethoxy)-styrene, and m-cyanostyrene. Examples of the α-alkyl-substituted styrene derivatives represented by the Formula Ib include o-methyl-α-methylstyrene, m-methyl-α-methylstyrene, p-methyl-α-methylstyrene and p-methoxy-α-methylstyrene. These styrene derivatives and α-alkyl-substituted styrene derivatives may individually be used in admixture of 2 or more.

In the present invention, the styrene type compound is used in an amount of 0.1 to 10 parts, preferably 0.3 to 5 parts, by weight per 1 part by weight of the polyphenylene oxide. The amount of the α-alkyl-substituted styrene derivative to be used is preferably 40% or less based on the total weight of the styrene compounds mixture.

Concrete examples of $R'_1$, $R'_2$, $R'_3$ and $R'_4$ in the Formula II representing the polyphenylene oxides employed in the present invention include hydrogen, chlorine, bromine and iodine atoms, and methyl, ethyl, propyl, allyl, phenyl, benzyl, methylbenzyl, chloromethyl, bromomethyl, cyanoethyl, cyano, monochloromethoxy, methoxy, ethoxy, phenoxy, nitro and dialkyl-substituted amino groups.

Concretely, examples of the polyphenylene oxides include poly-2,6-dimethyl-1,4-phenylene oxide,
poly-2,6-diethyl-1,4-phenylene oxide,
poly-2,6-dipropyl-1,4-phenylene oxide,
poly-2,6-dimethoxy-1,4-phenylene oxide,
poly-2,6-dichloromethyl-1,4-phenylene oxide,
poly-2,6-dibromomethyl-1,4-phenylene oxide,
poly-2,6-ditolyl-1,4-phenylene oxide,
poly-2,6-dichloro-1,4-phenylene oxide,
poly-2,5-dimethyl-1,4-phenylene oxide,
poly-2,6-diphenyl-1,4-phenylene oxide and
poly-2,6-dichloromethoxy-1,4-phenylene oxide.

The surfactant to be used in the present invention is preferably of the anionic or nonionic type, and is selected from, for example, alkali metal salts of higher fatty acids, alkali metal salts of alkylbenzenesulfonic acids, fatty acid esters of polyoxyethylene, alkyl ethers of polyoxyethylene, alkali metal salts of higher alcohol sulfate, alkali metal salts of condensation product of naphthalene sulfonic acid and formaldehyde, alkali metal salts of polyoxyethylene sulfate, polyoxyethylene alkyl phenol ethers, fatty acid esters of sorbitan, fatty acid esters of polyoxyethylene sorbitan, and block copolymers of oxyethylene and oxypropylene.

Examples of effective surfactants usable in the present invention include sodium stearate, sodium oleate, sodium palmitate, sodium myristate, sodium laurate, sodium dodecylbenzenesulfonate, polyoxyethylene monooleate, polyoxyethylene distearate, polyoxyethylene lauryl ether, polyoxyethylene-9-octadecene ether, rosined soap, potassium stearate, potassium oleate, potassium palmitate, sodium lauryl sulfate, potassium lauryl sulfate, sodium stearyl sulfate, sodium salt of polyoxyethylene lauryl sulfate, potassium salt of polyoxyethylene lauryl sulfate, sodium salt of polyoxyethylene lauryl phenyl sulfate, polyoxyethylene octylphenol ethers, polyoxyethylene nonyl phenyl ether, sorbitan monolaurate, sorbitan monooleate, polyoxyethylene sorbitan monolaurate, and block copolymers of oxyethylene and oxypropylene of molecular weight 2000, 3000 and 4000. These surfactants may be used in admixture of 2 or more.

The surfactant is not particularly restricted in amount employed, but is preferably used in a proportion of 0.01 to 10% by weight based on the amount of water.

Further, in order to maintain smoothly the dispersed state of the system, a common dispersion stabilizer may also be incorporated. Examples of such stabilizer include polyvinyl alcohols, sodium salt of 1:1 styrene-maleic anhydride copolymer, starch, gelatine, agar, cellulose sodium glycolate, calcium carbonate, barium carbonate, bentonite, carboxymethyl cellulose, hydroxypropyl methyl cellulose and calcium phosphate.

The catalyst employed in the present invention is a common organic or inorganic radical initiator. Examples of the catalyst include decanoyl peroxide, lauroyl peroxide, 3,5,5-trimethyl-hexanoyl peroxide, benzoyl peroxide, tertiary butyl perbenzoate, tertiary butyl peracetate, diisopropylbenzene hydroperoxide, di-tert-butyl peroxide, cyclohexanone peroxide, $\alpha,\alpha'$-azobisisobutyronitrile, hydrogen peroxide, potassium persulfate, ammonium persulfate and sodium perborate. These radical initiators may be used in admixture of 2 or more.

In order to attain a sufficiently high polymerization rate at a low temperature, the use of a redox catalyst comprising the above-mentioned radical initiator in combination with a reducing agent is sometimes advantageous. Usual reducing agents can be applied in the present invention. Examples of frequently-employed reducing agents include glucose, ammonium ferrous sulfate, sodium hydrogen-sulfite, N,N-dimethylaniline and p-chlorobenzenesulfinic acid. To the above-mentioned catalyst systems may be added such additives as sodium pyrophosphate, sodium hydrogen-sulfate and the like. These catalysts may be used in admixture of 2 more. The catalysts are not restricted in amount employed, but are ordinarily used in a proportion of 0.01 to 5% by weight based on the styrene type compound.

Solvents usable in the present invention are those which can dissolve the polyphenylene oxides but are substantially immiscible with water. They include aromatic hydrocarbons such as benzene, toluene, xylene, ethylbenzene, n-propylbenzene, i-propylbenzene, n-butylbenzene, i-butylbenzene, sec-butylbenzene, tert-butylbenzene, mesitylene, as-trimethylbenzene, tetramethylbenzene, indene, indane, amylbenzene, diethylbenzene, octylbenzene, n-propyltoluene, i-propyltoluene, methyl-ethylbenzene, and tert-butyl-ethylbenzene, halogen- or nitro-substitution products of aromatic hydrocarbons such as chlorobenzene, bromobenzene, dichlorobenzene, dibromobenzene, nitrobenzene, chloro-nitrobenzene, bromo-nitrobenzene, dinitrobenzene, chlorotoluene, dichlorotoluene, bromotoluene, iodotoluene, nitrotoluene, chloro-ethylbenzene, and chloroxylene and halogenated nonaromatic hydrocarbons such as chloroform, carbon tetrachloride and methylchloroform. These solvents are used, in general, in an amount of 0.5 to 20 times, preferably 1 to 10 times, the weight of the polyphenylene oxides.

The amount of water to be used is not particularly limited, but is at least 0.5 times, preferably 1 to 5 times, the total weight of polyphenylene oxide, styrene type compound and solvent.

In the present invention, the order and manner of addition of polyphenylene oxide, styrene type compound, surfactant, catalyst and other reaction reagents are not restricted. For example, the styrene type compound may be added to a solution of the polyphenylene oxide and the resulting mixture may be charged with water containing the catalyst and the surfactant, or a solution of the polyphenylene oxide and the styrene type compound may be added to water and then the mixture may be charged with the catalyst and the surfactant. Alternatively, the polyphenylene oxide and then the surfactant may be added to a mixture comprising water, a solvent, the styrene type compound and the catalyst.

In the polymerization reaction of the present invention, the reaction temperature is not particularly limited but is preferably from 40° to 150° C. Further, the reaction can be effected not only at atmospheric pressure but also under reduced or elevated pressure.

In the present invention, the presence of oxygen in the reaction system lowers the polymerization rate of styrene type compounds, graft efficiency and the like. It is therefore desirable to effect the reaction in an inert gas atmosphere or under reduced pressure, in general. This does, however, not mean that oxygen should be completely removed during the polymerization reaction.

In the present invention, the molecular weights of styrene type compound and $\alpha$-alkyl-substituted styrene derivative grafted on the polyphenylene oxide can be controlled by varying the concentrations of the styrene type compound, $\alpha$-alkyl-substituted styrene derivative, polyphenylene oxide and catalyst employed. Alternatively, said molecular weights can be controlled also by addition of a chain transfer agent employed in an ordinary polymerization reaction. Such chain transfer agent includes mercaptans and alcohols. Further, the physical properties of graft polyphenylene oxide can be varied by controlling the molecular weight and the number of branches of grafted styrene type compound.

After completion of the reaction, a polymer is deposited by bringing the reaction mixture as it is, or an oil layer separated therefrom by salting-out, into contact with a poor solvent for the polymer, and then the obtained polymer is separated from the mixture and dried. Alternatively, the polymer can be recovered by directly subjecting to hot air-drying or spray-drying the reaction mixture or an oil layer separated therefrom by salting-out.

According to the present invention, the styrene type compound lower in concentration than the polyphenylene oxide employed can be polymerized in spite of using a solvent, and, moreover, a high conversion of the styrene type compound can be attained.

Further, the present method makes it possible to obtain graft polymers high in graft efficiency of styrene type compounds.

The graft polymers produced in accordance with the present invention have been improved in flowability and enhanced in oxidation resistance without greatly changing the properties inherent to polyphenylene oxides. That is, according to the present invention, free hydroxyl groups of polyphenylene oxide are blocked without treating with any other reagents, and the resulting polymers are less in variation of color tone at elevated temperatures and are high in resistance to high temperature oxidation. Characteristics of the present invention are seen also in the above points.

Further, in the present invention is used a solvent for polyphenylene oxide, and therefore the reaction solution in the preparation of polyphenylene oxide can be directly used in the present invention.

The present invention will be illustrated below with reference to examples, but the examples are illustrative and not limitative, and various modifications are possible within the scope of the invention.

Example 1

In a 500 ml. separable flask equipped with a thermometer, a nitrogen-injecting pipe and a condenser, 16 g. of poly-2,6-dimethyl-1,4-phenylene oxide having a molecular weight of 70,000, which had been obtained by oxidative coupling reaction using sodium methylate and manganese chloride (II), was dissolved in 64 g. of industrial xylene. To this solution were added 16 g. of styrene, 200 g. of distilled water, 5 g. of sodium stearate as a surfactant, 0.2 g. of benzoyl peroxide as a catalyst, 0.5 g. of glucose and 0.5 g. of sodium pyrophosphate. Into the flask, a nitrogen gas was injected, while dispersing the above-mentioned compounds in the solution with vigorous stirring (620 r.p.m.), to exclude oxygen present in the system. Subsequently, the content of the flask was heated and reacted at 80° C. for 10 hours. After completion of the reaction, the reaction product was salted out by addition of 8 cc. of concentrated hydrochloric acid and 2 g. of magnesium chloride. The organic layer was charged into 500 ml. of methanol, and a precipitate formed was recovered by filtration and was washed with water to obtain 28.8 g. of a white polymer. The thus obtained polymer was extracted, in the same manner as in Referential Example 2, for 30 hours with hot acetone containing 15-20% by weight of cyclohexane to obtain 27.6 g. of the solvent-insoluble portion. When calculated from the above value, the styrene graft conversion was 72.5% and the styrene graft efficiency was 90.6%. The proportion of the bonded styrene based on the whole graft polymer was 42.4% by weight.

This graft polymer was compared in physical properties with a mixture formed by solution-blending a polyphenylene oxide having a molecular weight of 70,000 with a polystyrene having a molecular weight of 270,000 so that the amount of the latter became 42.4% by weight based on the whole mixture. The results are shown in Table 4.

TABLE 4

| Physical properties | Graft polymer | Mixture |
|---|---|---|
| Tensile impact value (kg./cm.²) | 72 | 71 |
| Minimum roll-kneadable temperature (° C.) | 245 | 290 |
| Tensile strength (kg./cm.²) | 600 | 590 |
| Coloration | (1) | (2) |
| Vicat softening point (° C.) | 157.3 | 149.8 |

[1] Pale yellow.
[2] Yellowish brown.

NOTE.—The tensile impact value was measured according to ASTM D-1822-61 T.

The minimum roll-kneadable temperature signifies the minimum roll temperature at which the sample was well kneadable and could be withdrawn in the form of a sheet.

The tensile strength (Japanese Industrial Standard No. 3 dumbbell of 1 mm. in thickness) was measured by autograph (Shimadzu Seisakusho, Type P100) at a stretching rate of 10 mm./min.

The coloration was measured by forming the sample into a sheet, hot-pressing the sheet under such conditions as 270° C., 10 min. and 100 kg./cm.², and visually observing the color of the sheet.

The Vicat softening point was measured according to ASTM D-1525-65 T.

TABLE 5

| | |
|---|---|
| Styrene graft conversion (percent) | 53.6 |
| Styrene graft efficiency (percent) | 68.8 |
| Ratio of bonded styrene to whole graft polymer (percent) | 32.0 |
| Tensile impact value (kg./cm.²) | 70 |
| Minimum roll-kneadable temperature (° C.) | 250 |
| Tensile strength (kg./cm.²) | 620 |
| Coloration | Pale yellow |
| Vicat softening point (° C.) | 154.5 |

Example 3

Example 1 was repeated, except that a mixture of 0.2 g. of potassium persulfate and 0.3 g. of sodium hydrogensulfite was used as the catalyst, whereby 29.1 g. of a white polymer was obtained. The thus obtained polymer was extracted in the same manner as in Example 1 to obtain 28.2 g. of a graft polymer.

Characteristics values of the polymerization and physical properties of the polymer are shown in Table 6.

TABLE 6

| | |
|---|---|
| Styrene graft conversion (percent) | 76.3 |
| Styrene graft efficiency (percent) | 92.7 |
| Ratio of bonded styrene to whole graft polymer (percent) | 43.2 |
| Tensile impact value (kg./cm.²) | 71 |
| Minimum roll-kneadable temperature (° C.) | 240 |
| Tensile strength (kg./cm.²) | 610 |
| Coloration | Pale yellow |
| Vicat softening point (° C.) | 156.5 |

Example 4

Example 1 was repeated, except that 0.2 g. of 3,5,5-trimethylhexanoyl peroxide was used as the peroxide catalyst, whereby 27.5 g. of a white polymer was obtained. The thus obtained polymer was extracted in the same manner as in Example 1 to obtain 26.0 g. of a graft polymer.

Characteristics values of the polymerization and physical properties of the polymer are shown in Table 7.

TABLE 7

| | |
|---|---|
| Styrene conversion (percent) | 72.0 |
| Styrene graft conversion (percent) | 62.6 |
| Styrene graft efficiency (percent) | 87.0 |
| Ratio of bonded styrene to whole graft polymer (percent) | 38.5 |
| Tensile impact value (kg./cm.²) | 75 |
| Minimum roll-kneadable temperature (° C.) | 260 |
| Tensile strength (kg./cm.²) | 650 |
| Coloration | Pale yellow |
| Vicat softening point (° C.) | 156.5 |

Example 5

Example 1 was repeated, except that the kind of the surfactant was varied. The results are shown in Table 8.

TABLE 8

| Run No. | Surfactant | Monomer conversion (percent) | Graft conversion (percent) | Graft efficiency (percent) |
|---|---|---|---|---|
| 1 | Sodium stearate | 80.0 | 72.5 | 91.0 |
| 2 | Sodium myristate | 78.0 | 70.0 | 89.9 |
| 3 | Sorbitan monolaurate | 11.6 | 5.0 | 43.0 |
| 4 | Lauryl trimethyl ammonium chloride | 0 | 0 | 0 |
| 5 | Polyoxyethylene alkylamine | 0 | 0 | 0 |

Example 2

Example 1 was repeated, except that 0.2 g. of potassium persulfate was used as the catalyst, whereby 28.5 g. of a white polymer was obtained. The thus obtained polymer was extracted in the same manner as in Example 1 to obtain 24.6 g. of a graft polymer.

Characteristics values of the polymerization and physical properties of the polymer are shown in Table 5.

Example 6

Example 1 was repeated, except that 0.2 g. of potassium persulfate was used as the catalyst and 5 g. of sodium laurate was used as the surfactant, whereby 29.3 g. of a white polymer was obtained. The thus obtained polymer was extracted in the same manner as in Example 1 to obtain 28.0 g. of a graft polymer.

Characteristic values of the polymerization and physical properties of the polymer are shown in Table 9.

TABLE 9

| | |
|---|---|
| Styrene graft conversion (percent) | 75 |
| Styrene graft efficiency (percent) | 90 |
| Ratio of bonded styrene to whole graft polymer (percent) | 43.4 |
| Tensile impact value (kg./cm.$^2$) | 71 |
| Minimum roll-kneadable temperature (° C.) | 265 |
| Tensile strength (kg./cm.$^2$) | 620 |
| Coloration | Pale yellow |
| Vicat softening point (° C.) | 155.5 |

Example 7

Example 1 was repeated, except that 0.2 g. of potassium persulfate was used as the catalyst and 5.0 g. of polyoxyethylene monooleate was used as the surfactant, whereby 22.9 g. of a white polymer was obtained. The thus obtained polymer was extracted in the same manner as in Example 1 to obtain 22.1 g. of a graft polymer.

Characteristic values of the polymerization and physical properties of the polymer are shown in Table 10.

TABLE 10

| | |
|---|---|
| Styrene graft conversion (percent) | 38.0 |
| Styrene graft efficiency (percent) | 90.0 |
| Ratio of bonded styrene to whole graft polymer (percent) | 27.5 |
| Tensile impact value (kg./cm.$^2$) | 75 |
| Minimum roll-kneadable temperature (° C.) | 260 |
| Tensile strength (kg./cm.$^2$) | 630 |
| Coloration | Pale yellow |
| Vicat softening point (° C.) | 156.5 |

Example 8

Example 1 was repeated, except that 0.2 g. of potassium persulfate was used as the catalyst and a mixture of 2.5 g. of polyoxyethylene monooleate and 2.5 g. of sodium laurate was used as the surfactant, whereby 28.8 g. of a white polymer was obtained. The thus obtained polymer was extracted in the same manner as in Example 1 to obtain 27.2 g. of a graft polymer.

Characteristic values of the polymerization and physical properties of the polymer are shown in Table 11.

TABLE 11

| | |
|---|---|
| Styrene graft conversion (percent) | 70.0 |
| Styrene graft efficiency (percent) | 87.5 |
| Ratio of bonded styrene to whole graft polymer (percent) | 41.2 |
| Tensile impact value (kg./cm.$^2$) | 72 |
| Minimum roll-kneadable temperature (° C.) | 250 |
| Tensile strength (kg./cm.$^2$) | 610 |
| Coloration | Pale yellow |
| Vicat softening point (° C.) | 154.5 |

Example 9

Example 1 was repeated, except that 5 g. of sodium dodecylbenzenesulfonate was used as the surfactant, whereby 24.1 g. of a white polymer was obtained. The thus obtained polymer was extracted in the same manner as in Example 1 to obtain 22.4 g. of a graft polymer.

Characteristic values of the polymerization and physical properties of the polymer are shown in Table 12.

TABLE 12

| | |
|---|---|
| Styrene graft conversion (percent) | 40.0 |
| Styrene graft efficiency (percent) | 79.0 |
| Ratio of bonded styrene to whole graft polymer (percent) | 28.6 |
| Tensile impact value (kg./cm.$^2$) | 70 |
| Minimum roll-kneadable temperature (° C.) | 250 |
| Tensile strength (kg./cm.$^2$) | 600 |
| Coloration | Pale yellow |
| Vicat softening point (° C.) | 158.5 |

Example 10

Example 1 was repeated, except that 5 g. of polyoxyethylene-9-octadecene ether was used as the surfactant, whereby 26.2 g. of a white polymer was obtained. The thus obtained polymer was extracted in the same manner as in Example 1 to obtain 22.9 g. of a graft polymer.

Characteristic values of the polymerization and physical properties of the polymer are shown in Table 13.

TABLE 13

| | |
|---|---|
| Styrene graft conversion (percent) | 43.1 |
| Styrene graft efficiency (percent) | 67.7 |
| Ratio of bonded styrene to whole graft polymer (percent) | 30.1 |
| Tensile impact value (kg./cm.$^2$) | 68 |
| Minimum roll-kneadable temperature (° C.) | 250 |
| Tensile strength (kg./cm.$^2$) | 600 |
| Coloration | Pale yellow |
| Vicat softening point (° C.) | 154.0 |

Example 11

Example 1 was repeated, except that a mixture of 2.5 g. of polyoxyethylene-9-octadecene ether and 2.5 g. of sodium stearate was used as the surfactant, whereby 28.2 g. of a white polymer was obtained. The thus obtained polymer was extracted in the same manner as in Example 1 to obtain 25.9 g. of a graft polymer.

Characteristic values of the polymerization and physical properties of the polymer are shown in Table 14.

TABLE 14

| | |
|---|---|
| Styrene graft conversion (percent) | 62.0 |
| Styrene graft efficiency (percent) | 81.0 |
| Ratio of bonded styrene to whole graft polymer (percent) | 38.2 |
| Tensile impact value (kg./cm.$^2$) | 72 |
| Minimum roll-kneadable temperature (° C.) | 250 |
| Tensile strength (kg./cm.$^2$) | 630 |
| Coloration | Pale yellow |
| Vicat softening point (° C.) | 153.5 |

Example 12

Example 1 was repeated, except that a mixture of 8 g. of styrene and 8 g. of p-methoxystyrene was added in place of 16 g. of styrene, whereby 29.3 g. of a white polymer was obtained. The thus obtained polymer was extracted in the same manner as in Example 1 to obtain 28.0 g. of a graft polymer.

Characteristic values of the polymerization and physical properties of the polymer are shown in Table 15.

TABLE 15

| | |
|---|---|
| Styrene graft conversion (percent) | 75.0 |
| Styrene graft efficiency (percent) | 90.3 |
| Tensile impact value (kg./cm.$^2$) | 58 |
| Minimum roll-kneadable temperature (° C.) | 243 |
| Tensile strength (kg./cm.$^2$) | 600 |
| Coloration of hot-pressed sheet | Pale yellow |
| Vicat softening point (° C.) | 154.0 |

Example 13

Example 1 was repeated, except that poly-2,6-diethyl-1,4-phenylene oxide having a molecular weight of 70,000 was used in place of the poly-2,6-dimethyl-1,4-phenylene oxide, whereby 30.0 g. of a polymer was obtained. The thus obtained polymer was extracted in the same manner as in Example 1 to obtain 28.6 g. of a graft polymer. Characteristic values of the polymerization and physical properties of the polymer are shown in Table 16.

TABLE 16

| | |
|---|---|
| Styrene graft conversion (percent) | 79.4 |
| Styrene graft efficiency (percent) | 90 |
| Tensile impact value (kg./cm.$^2$) | 63 |
| Minimum roll-kneadable temperature (° C.) | 245 |
| Tensile strength (kg./cm.$^2$) | 590 |
| Coloration of hot-pressed sheet | Pale yellow |
| Vicat softening point (° C.) | 152.5 |

Example 14

Example 1 was repeated, except that a mixture of 0.2 g. of tert-butyl perbenzoate and 0.5 g. of glucose was used as the catalyst, whereby 29.0 g. of a white polymer was obtained. The thus obtained polymer was extracted in the same manner as in Example 1 to obtain 27.2 g. of a graft polymer.

Characteristic values of the polymerization and physical properties of the polymer are shown in Table 17.

TABLE 17

| | |
|---|---|
| Styrene graft conversion (percent) | 70.0 |
| Styrene graft efficiency (percent) | 86.2 |
| Tensile impact value (kg./cm.$^2$) | 60 |
| Minimum roll-kneadable temperature (° C.) | 240 |
| Tensile strength (kg./cm.$^2$) | 610 |
| Coloration of hot-pressed sheet | Pale yellow |
| Vicat softening point (° C.) | 154.5 |

Example 15

Example 14 was repeated, except that a mixture of 8 g. of styrene and 8 g. of α-methylstyrene was used in place of 16 g. of styrene, whereby 27.6 g. of a polymer was obtained. The thus obtained polymer was extracted in the same manner as in Example 1 to obtain 26.0 g. of a graft polymer.

Characteristic values of the polymerization and physical properties of the polymer are shown in Table 18.

TABLE 18

| | |
|---|---|
| Styrene graft conversion (percent) | 62.5 |
| Styrene graft efficiency (percent) | 86.3 |
| Tensile impact value (kg./cm.$^2$) | 62 |
| Minimum roll-kneadable temperature (° C.) | 245 |
| Tensile strength (kg./cm.$^2$) | 600 |
| Coloration of hot-pressed sheet | Pale yellow |
| Vicat softening temperature (° C.) | 164.3 |

Example 16

Example 14 was repeated, except that a mixture of 8 g. of styrene and 8 g. of α-methyl-p-methylstyrene was used in place of 16 g. of styrene, whereby 28.0 g. of a polymer was obtained. The thus obtained polymer was extracted in the same manner as in Example 1 to obtain 26.4 g. of a graft polymer.

Characteristic values of the polymerization and physical properties of the polymer are shown in Table 19.

TABLE 19

| | |
|---|---|
| Styrene graft conversion (percent) | 65.0 |
| Styrene graft efficiency (percent) | 86.7 |
| Tensile impact value (kg./cm.$^2$) | 65 |
| Minimum roll-kneadable temperature (° C.) | 245 |
| Tensile strength (kg./cm.$^2$) | 600 |
| Coloration of hot-pressed sheet | Pale yellow |
| Vicat softening point (° C.) | 168.1 |

Example 17

Example 1 was repeated, except that a mixture of 0.1 g. of tert-butyl perbenzoate, 0.1 g. of 3,5,5 - trimethylhexanoyl peroxide and 0.5 g. of glucose was used as the catalyst, whereby 29.5 g. of a white polymer was obtained. The thus obtained polymer was extracted in the same manner as in Example 1 to obtain 27.8 g. of a graft polymer.

Characteristic values of the polymerization and physical properties of the polymer are shown in Table 20.

TABLE 20

| | |
|---|---|
| Styrene graft conversion (percent) | 73.7 |
| Styrene graft efficiency (percent) | 85.5 |
| Tensile impact value (kg./cm.$^2$) | 60 |
| Minimum roll-kneadable temperature (° C.) | 243 |
| Tensile strength (kg./cm.$^2$) | 610 |
| Coloration of hot-pressed sheet | Pale yellow |
| Vicat softening point (° C.) | 157.5 |

Example 18

Example 1 was repeated, except that 2.5 g. of sodium stearate was used as the surfactant and 1.0 g. of sodium salt of carboxymethyl cellulose was used as the dispersion stabilizer, whereby 27.8 g. of a white polymer was obtained. The thus obtained polymer was extracted in the same manner as in Example 1 to obtain 26.0 g. of a graft polymer.

Characteristic values of the polymerization and physical properties of the polymer are shown in Table 21.

TABLE 21

| | |
|---|---|
| Styrene graft conversion (percent) | 62.5 |
| Styrene graft efficiency (percent) | 84.7 |
| Tensile impact value (kg./cm.$^2$) | 62 |
| Minimum roll-kneadable temperature (° C.) | 247 |
| Tensile strength (kg./cm.$^2$) | 615 |
| Coloration of hot-pressed sheet | Pale yellow |
| Vicat softening point (° C.) | 159.5 |

Example 19

Example 17 was repeated, except that styrene was used in an amount of 9.6 g. whereby 23.5 g. of a white polymer was obtained. The thus obtained polymer was extracted in the same manner as in Example 1 to obtain 21.8 g. of a graft polymer.

Characteristic values of the polymerization and physical properties of the polymer are shown in Table 22.

TABLE 22

| | |
|---|---|
| Styrene graft conversion (percent) | 60.4 |
| Styrene graft efficiency (percent) | 77.3 |
| Tensile impact value (kg./cm.$^2$) | 67 |
| Minimum roll-kneadable temperature (° C.) | 242 |
| Tensile strength (kg./cm.$^2$) | 620 |
| Coloration of hot-pressed sheet | Pale yellow |
| Vicat softening point (° C.) | 157.0 |

Example 20

2,6-xylenol was oxidatively polymerized by using manganese (II) chloride-sodium methylate catalyst in industrial xylene containing a small amount of methanol to give a solution containing 20 wt. percent of concentration of a polymer. Into 400 ml. of the thus obtained solution was added 250 ml. of 1% hydrochloric acid and the resultant mixture was stirred at 50° C. for 2 hours. The resultant organic layer was separated from an aqueous layer and washed with 200 ml. of water to prepare an oxidative polymerization reaction mixture of 2,6-xylenol.

Example 1 was repeated except that 80 g. of the thus prepared oxidative polymerization reaction mixture was used instead of poly-2,6-dimethyl-1,4-phenylene oxide, to give 28.5 g. of white polymer.

Characteristic values of the polymerization and physical properties of the polymer are shown in Table 23.

TABLE 23

| | |
|---|---|
| Styrene graft conversion (percent) | 78 |
| Styrene graft efficiency (percent) | 94 |
| Tensile impact value (kg./cm.$^2$) | 66 |
| Minimum roll-kneadable temperature (° C.) | 240 |
| Tensile strength (kg./cm.$^2$) | 580 |
| Coloration | Pale yellow |

What is claimed is:

1. A method for producing graft polyphenylene oxides, which comprises contacting a styrene derivative represented by the formula:

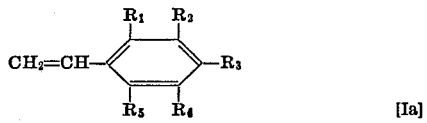

[Ia]

wherein $R_1$, $R_2$, $R_3$, $R_4$ and $R_5$ are individually a hydrogen atom, a halogen atom, a cyano group, a nitro group, an amino group, a mono- or di-alkylamino group, a sulfo group, an unsubstituted or halogen- or cyano-substituted hydrocarbon group or an unsubstituted or halogen-substituted hydrocarbonoxy group, or a mixture of the styrene derivative of the Formula Ia and an α-alkyl-substituted styrene derivative represented by the formula:

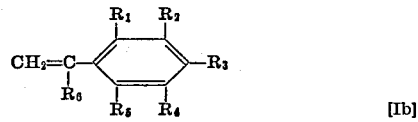

[Ib]

wherein $R_1$, $R_2$, $R_3$, $R_4$ and $R_5$ have the same meanings as defined above, and $R_6$ is an alkyl group, with a radical initiator in the presence of a polyphenylene oxide having recurring structural units represented by the formula:

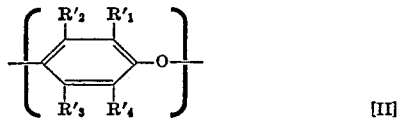

[II]

wherein $R'_1$, $R'_2$, $R'_3$ and $R'_4$ are individually a hydrogen atom, a halogen atom, an unsubstituted or halogen- or cyano-substituted hydrocarbon group, an unsubstituted or halogen-substituted hydrocarbonoxy group, a cyano group, a mono- or di-alkylamino group or a nitro group, the amount of the styrene derivative or the mixture of the styrene derivative and the α-alkyl-substituted styrene derivative being 0.3 to 5 parts by weight per 1 part by weight of the polyphenylene oxide, in an aqueous dispersion comprising water, an anionic or nonionic surfactant, and a solvent for said polyphenylene oxide, selected from the group consisting of aromatic hydrocarbon, halogen- or nitro-substitution product of aromatic hydrocarbons, and halogenated nonaromatic hydrocarbons, the amount of the solvent being 0.5 to 20 parts by weight per 1 part of the polyphenylene oxide.

2. A method according to claim 1, wherein the solvent is benzene, toluene, xylene, ethylbenzene, i-propylbenzene, chlorobenzene, nitrobenzene, chloroform or carbon tetrachloride.

3. A method according to claim 1, wherein the styrene derivative is styrene, p-methoxystyrene, p-methylstyrene, p-aminostyrene, p-chlorostyrene, or o-hydroxystyrene.

4. A method according to claim 1, wherein the α-alkyl-substituted styrene derivative is α-methylstyrene, α-dimethyl-p-methylstyrene, or α-dimethyl-o-methylstyrene.

5. A method according to claim 1, wherein the amount of the α-alkyl-substituted styrene derivative is up to 40% based on the total weight of the styrene compounds mixture.

6. A method according to claim 1, wherein the polyphenylene oxide is poly-2,6-dimethyl-1,4-phenylene oxide or poly-2,6-diethyl-1,4-phenylene oxide.

7. A method according to claim 1, wherein the surfactant is sodium stearate, sodium myristate, sorbitan monolaurate, sodium laurate, polyoxyethylene monooleate, sodium dodecylbenzenesulfonate or polyoxyethylene-9-octadecene ether.

8. A method according to claim 1, wherein the radical initiator is benzoyl peroxide, potassium persulfate, 3,5,5-trimethylhexanoyl peroxide or tert-butyl perbenzoate.

9. A method according to claim 1, wherein there is used a redox catalyst prepared by combining the radical initiator with a reducing agent.

10. A method according to claim 9, wherein the reducing agent is glucose, or sodium hydrogen sulfite.

11. A method according to claim 1 wherein the amount of the solvent is 1 to 10 parts by weight per part by weight of the polyphenylene oxide.

12. A method according to claim 1, wherein the amount of water is 1 to 5 parts by weight per part by weight of the polyphenylene oxide.

13. A method according to claim 1, wherein the amount of water is 0.5 or more part by weight per 1 part by weight of the polyphenylene oxide.

14. A modified polyphenylene oxide obtained according to claim 1.

References Cited

UNITED STATES PATENTS

| | | |
|---|---|---|
| 3,356,761 | 12/1967 | Fox. |
| 3,384,682 | 5/1968 | Erchak et al. |
| 3,522,326 | 7/1970 | Bostick et al. |

MELVIN GOLDSTEIN, Primary Examiner

U.S. Cl. X.R.

260—23 S, 29.6 NR, 874